No. 812,545. PATENTED FEB. 13, 1906.
T. G. CLARIDGE & T. A. RANDALL.
PRINTING PRESS.
APPLICATION FILED JUNE 25, 1903. RENEWED SEPT. 6, 1905.
6 SHEETS—SHEET 1.
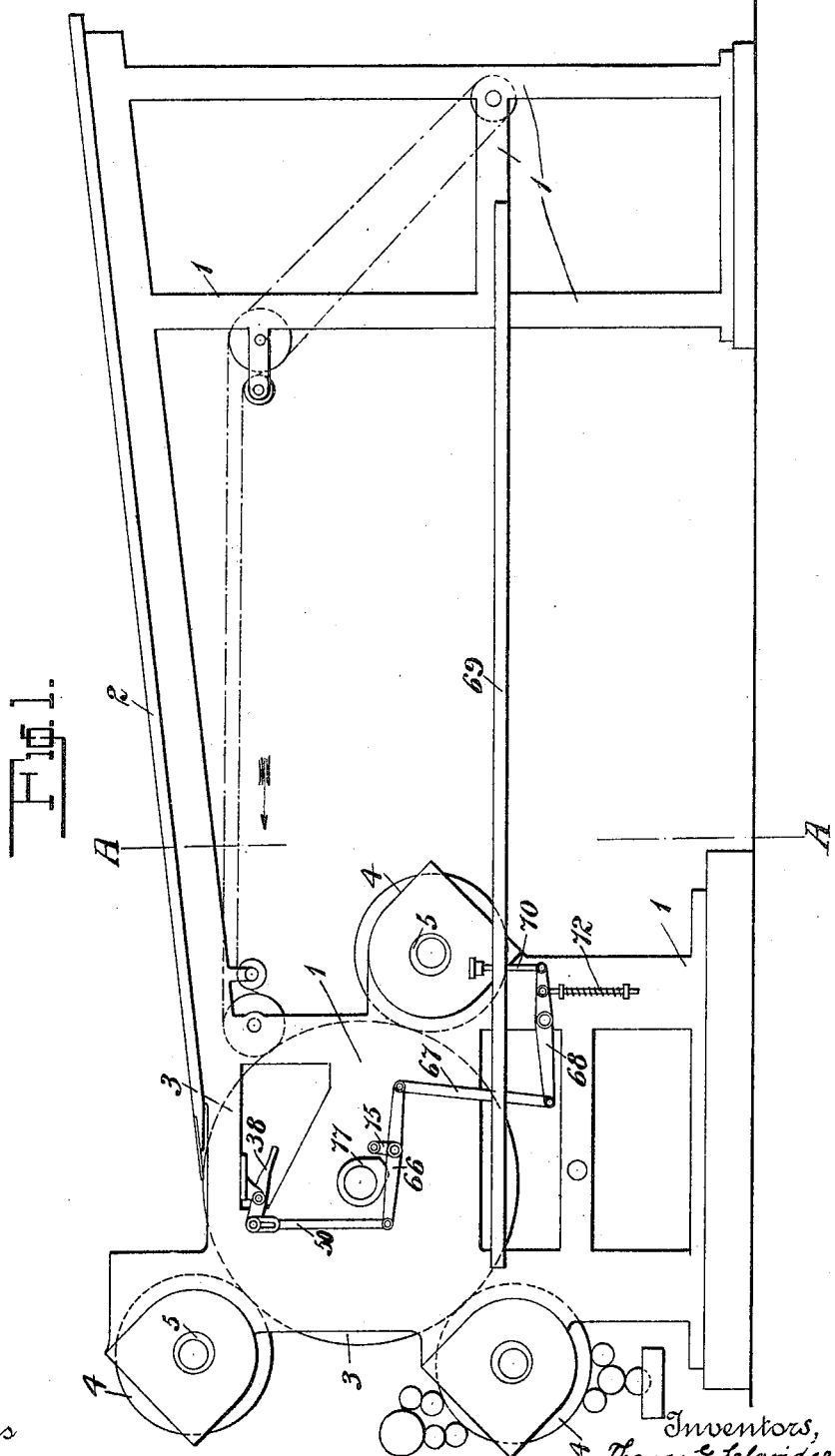

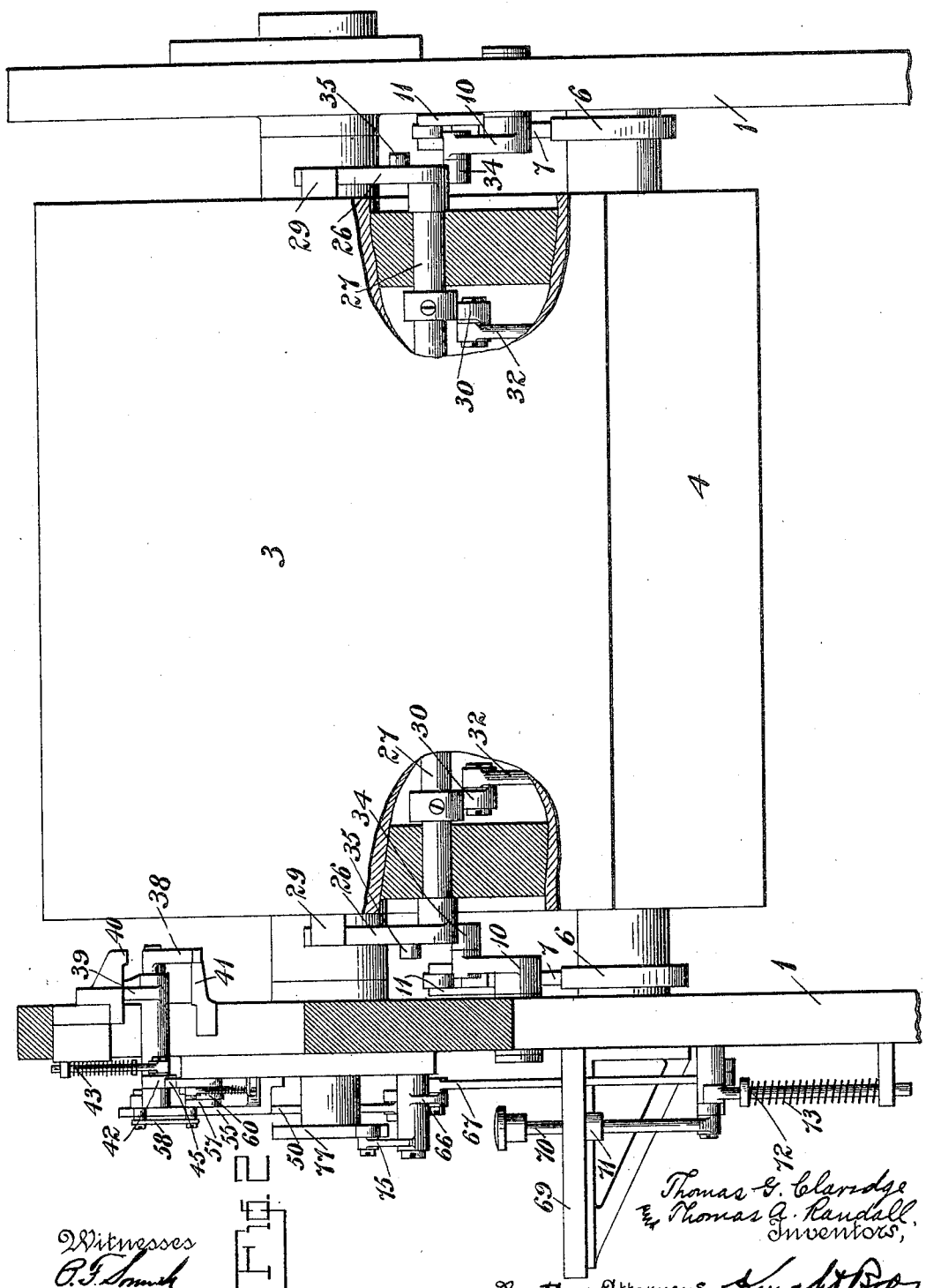

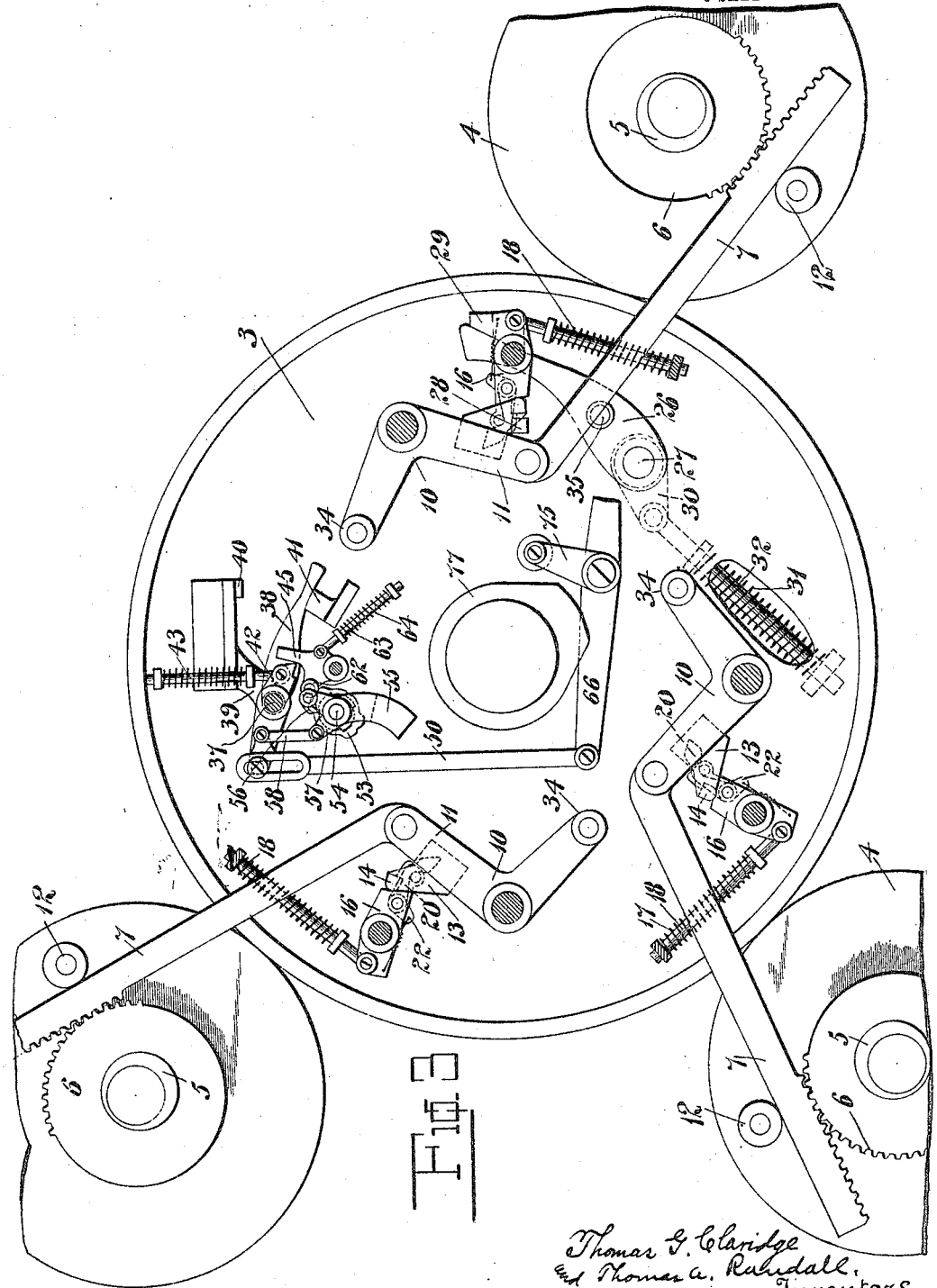

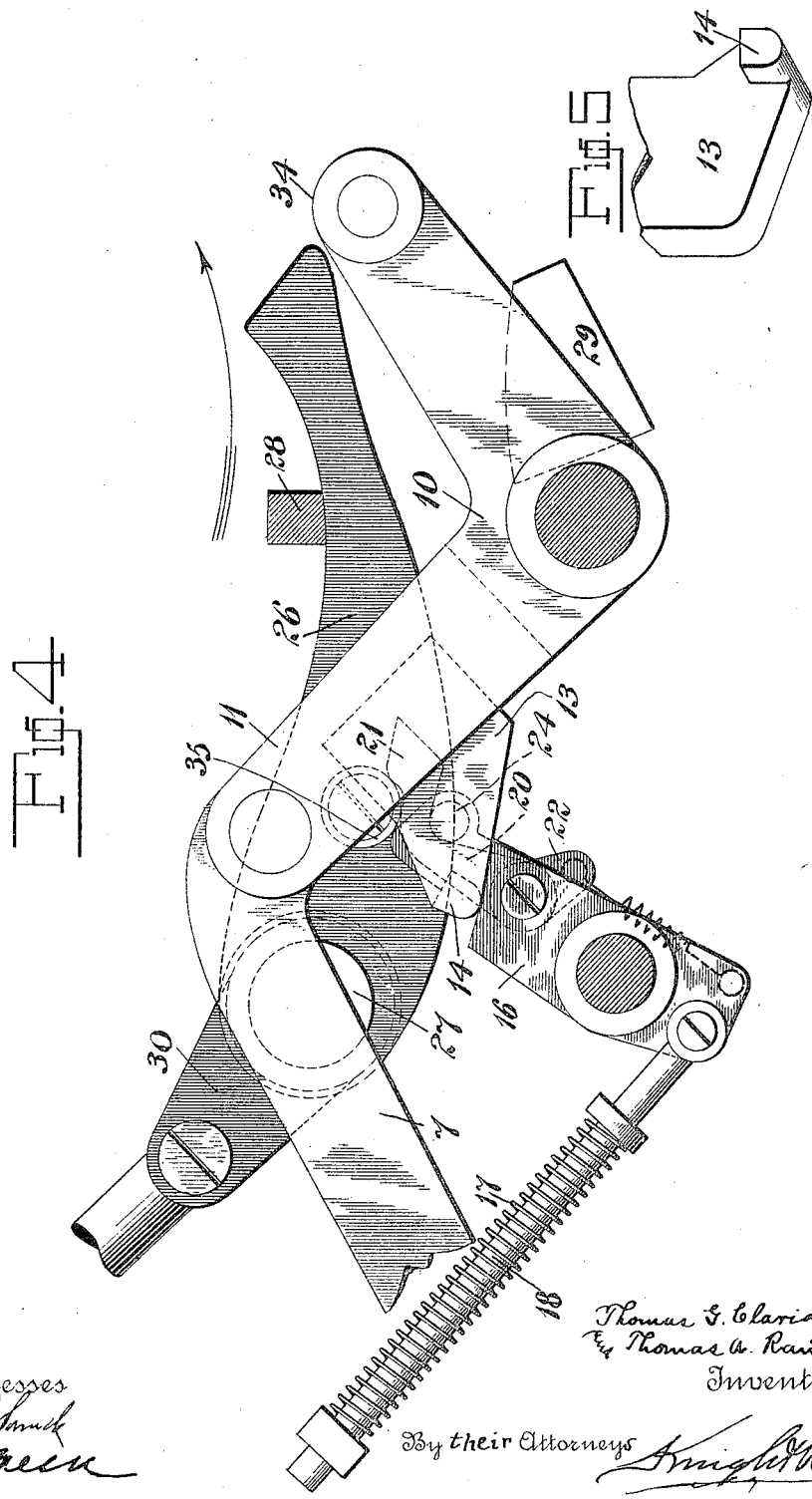

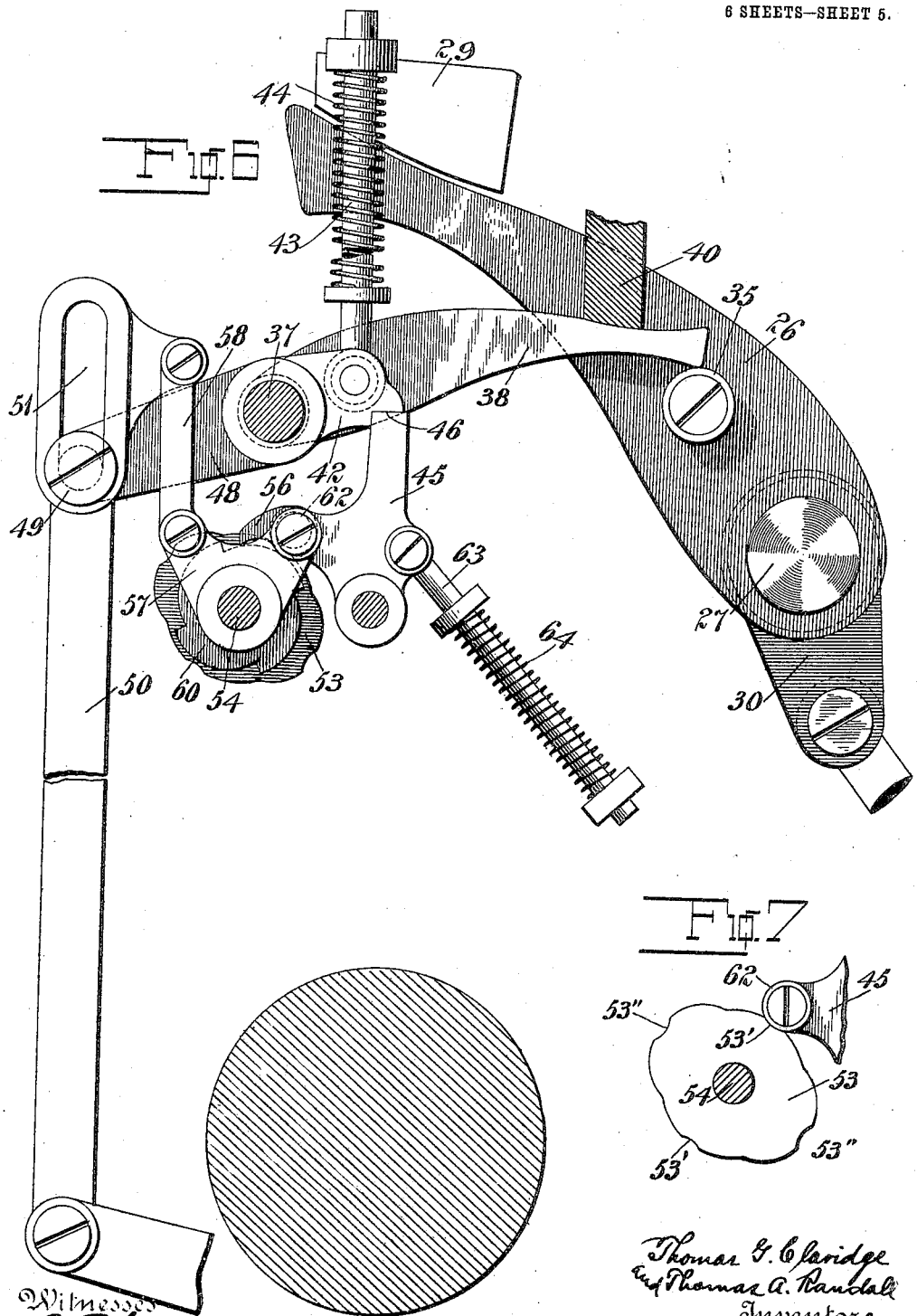

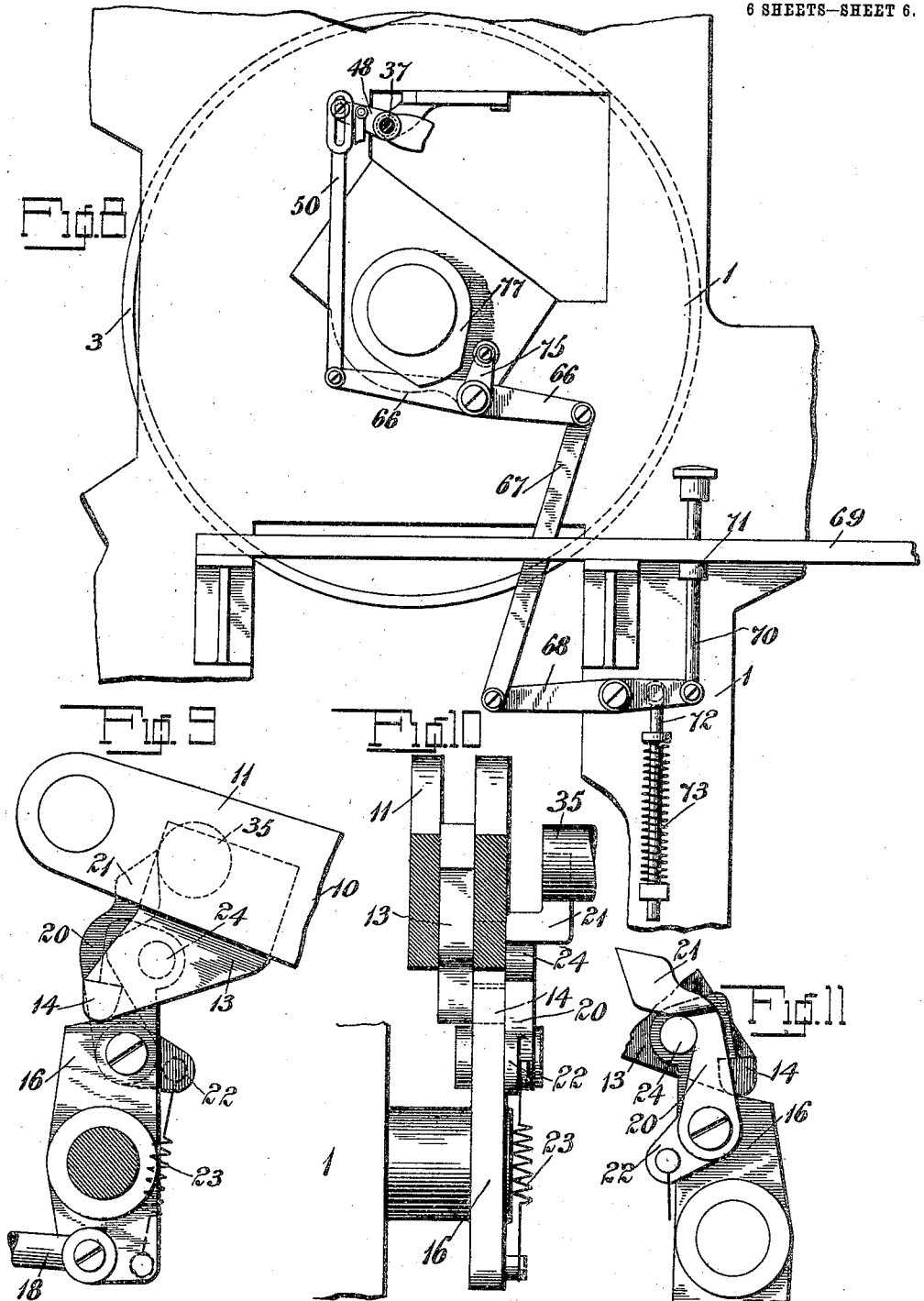

UNITED STATES PATENT OFFICE.

THOMAS G. CLARIDGE AND THOMAS A. RANDALL, OF PLAINFIELD, NEW JERSEY, ASSIGNORS TO ALUMINUM PRESS COMPANY, OF NEW YORK, N. Y., A CORPORATION OF NEW YORK.

PRINTING-PRESS.

No. 812,545.          Specification of Letters Patent.          Patented Feb. 13, 1906.

Application filed June 25, 1903. Renewed September 6, 1905. Serial No. 277,257.

*To all whom it may concern:*

Be it known that we, THOMAS G. CLARIDGE and THOMAS A. RANDALL, citizens of the United States, residing at Plainfield, in the county of Union and State of New Jersey, have invented certain new and useful Improvements in Printing-Presses, of which the following is a specification.

The present invention relates to improvements in printing-presses, and particularly to multicolor surface printing-presses of the type in which a plurality of form or plate cylinders are arranged circumferentially with relation to a common impression-cylinder. In this type of printing-press the plate or form cylinders are movable toward and away from the impression-cylinders to bring them into and out of printing position.

The present invention consists of a novel construction of mechanism for moving the plate or form cylinders into and out of printing relation with the impression-cylinder and for locking them in printing position while the machine is operating.

The invention further consists in the peculiar construction and arrangement of parts for producing the desired rsults, all as hereinafter fully described, and more particularly pointed out in the claims.

In the accompanying drawings, Figure 1 is a side elevation of a multicolor printing-press disclosing the general arrangement of the parts. Fig. 2 is a transverse vertical section on the line A A, Fig. 1. Fig. 3 is an end elevation of the impression-cylinder and the plate or form cylinders, showing the operative relation of the shifting mechanism when the cylinders are in printing position. Fig. 4 is an enlarged detail view showing the operative relation of the cam-arm on the cylinder and the rack-bar-operating bell-crank. Fig. 5 is a detail perspective view showing one of the elements of the latching device. Fig. 6 is an enlarged view showing the operative relation of the cam-arm on the cylinder with its governing-shoe. Fig. 7 is a detail of a cam and cam-roller for operating the governing-shoe latch. Fig. 8 is a side elevation of a portion of the press, showing the means for controlling the governing-shoe. Fig. 9 is a detail side elevation of the mechanism for locking the cylinders in printing position. Fig. 10 is an edge view of the same. Fig. 11 is a view of the reverse side or parts of the mechanism shown in Fig. 9.

1 is the frame of a multicolor-surface printing-press, 2 the feed-table, and 3 the centrally-arranged impression-cylinder mounted in rigid bearings in the frame of the press. Arranged circumferentially with relation to the impression-cylinder is a plurality of form or plate cylinders 4, mounted in eccentric bushings or bearings 5, which are adjustable to move said plate or form cylinders toward or away from the periphery of the impression-cylinder 3. These eccentric bushings constitute the supporting-journals for the plate or form cylinders, and said bushings are provided with segmental gears 6, which are in constant mesh with longitudinally-movable rack-bars 7, so that when said rack-bars are operatively acted upon by their controlling mechanism they will move the plate or form cylinders into or out of printing relation with the impression-cylinder.

The mechanism so far described is well known in the art and is not claimed as constructively new, but is explained to more completely disclose the application of the present invention. The novelty in the present case consists in the mechanism for operating the rack-bars by the power of the press under the control of the operator at any point in the cycle of operation of the press. As the construction of the means for controlling and operating the plate or form cylinders is substantially in duplicate and identical on both sides of the impression-cylinder, we will herein describe the elements disclosed on the operator's side of the press, as shown in Fig. 2.

Each rack-bar 7 is pivotally connected at its inner end with a bell-crank lever 10, which is suitably journaled in the machine-frame adjacent to the ends of the impression-cylinder. The rack-bars 7 are held in constant mesh with the segmental gears 6 of the adjustable bearings or bushings of the plate or form cylinder by means of suitable guides, such as antifriction-rollers 12. Each of the bifurcated arms 11 of the bell-crank levers 10, which operate the rack-bars, is provided with a projecting arm or bracket 13, formed with a latching-shoulder 14, which is adapted to be engaged by a hook or latch 16, journaled upon the machine-frame, as shown in Fig. 10, and actuated by an expansion-spring 17, which tends to throw it into engagement with the latching-shoulder on the bell-crank lever. The expansion-spring 17 is suitably supported on a rod 18, one end of said rod being pivotally attached to the latch 16, while the other end is secured to the machine-frame. This spring-actuated hook or latch securely locks the bell-crank lever into the position into which it is moved when the plate or form cylinder is shifted into printing position, the purpose of the latch being to prevent the vibrations of the machine from shifting the plate or form cylinder out of printing position. Journaled upon said latch or hook 16 is a tripping-arm 20, formed with a head 21, projecting inwardly toward the axis of the impression-cylinder. This tripping-arm 20 is provided with a heel 22, projecting beyond its journal, to which is attached a spring 23 for the purpose of holding the tripping-arm normally in contact with a pin or lug 24, which projects from the face of the latch or hook. (See Figs. 9, 10, and 11.) The purpose of this tripping-arm is to release the cylinder-shifting mechanism from the locking latch or hook 16 just prior to the moment when its actuating mechanism engages it, the construction being such that when the press-cylinders are rotated forwardly and it is desired to throw the cylinders out of printing position the tripping-arm 20 will be operated by its actuating mechanism and cause the locking latch or hook 16 to be released; but when the press-cylinders are rotated rearwardly or in the improper direction for printing the tripping-arm will yield rearwardly when the actuating mechanism engages it, and thereby avoid injury to the mechanism, as shown in Fig. 9.

The actuating device for the form-cylinder-shifting means will now be described: At each end of the centrally-located impression-cylinder 3 is mounted a shiftable controlling cam arm 26. Each one of these shiftable cam-arms is suitably journaled upon a shaft 27, which extends longitudinally through the impression-cylinder, said cam-arm being curved and tapered slightly from its supporting-pivot to its free end and is so mounted as to extend eccentrically with relation to the periphery of the impression-cylinder. Inner and outer stop-lugs 28 and 29 are provided for the engagement of the free end of the shiftable cam-arm to firmly support it while it is operating upon the plate or form cylinder shifting devices. A heel 30 projects rearwardly from the journal of the controlling cam-arm, and an expansion-spring 31 is mounted upon a guide-rod 32, which is connected to the heel, the said spring and guide-rod being so arranged with relation to the pivot of the controlling-cam arm that said cam-arm will be automatically locked in either its inner or outer position. Each of the bell-cranks 10, which operate the rack-bars, as hereinafter described, carries on its free arm an antifriction-roller 34, which is adapted to travel upon the inner or outer surface of the controlling-cam arm 26 just described when the plate or form cylinders are to be shifted into or out of printing relation, said antifriction-roller traveling upon the outer surface of the cam-arm when the cam-arm is shifted to its inner position, and vice versa when the cam-arm is shifted to its outer position. The controlling-cam arm 26 also carries thereon an antifriction-roller 35, which is adapted when the controlling cam-arm is in its inner shifted position, as shown in Fig. 4, to travel in the path of the head 21 of the tripping-arm 20, in turn carried by the latch or hook 16, above referred to, and cause said latch or hook to release the cylinder-shifting mechanism just prior to the moment when the operating bell-crank lever is actuated by the controlling-cam arm.

It will be observed that the mechanism as far as described would effect the shifting of the form or plate cylinders from one position to another—that is, into and out of contactual relation with the impression-cylinder—and allow them to remain in either position. To complete the operating mechanism, it is necessary to provide means for shifting the controlling-cam arm to inner and outer operating positions at the will of the operator. This is accomplished by having a governing-shoe 38 suitably journaled in a bracket 39, supported upon the stud 37 in the machine-frame adjacent to one end of the impression-cylinder and in position to engage the controlling-cam arm 26 of the plate or form cylinder shifting mechanism above described. The shoe 38 is slightly curved and tapered from its journaled end to its free end, and, in fact, is of a shape very similar to the controlling-cam arm which it governs. If the controlling-cam arm 26 is in its outer position and the governing-shoe is moved to its outer position against the stop 40, as shown in Fig. 6, the roller 35 on the cam-arm will engage the inner surface of the governing-shoe and force the cam-arm to its inner shifted position. When such operation occurs as shown in Fig. 4, the controlling-cam arm will be in position to trip the latches or hooks 16, thereby unlocking the bell-crank levers and permitting the outer surface of the cam-arm to engage and rock the bell-crank levers to operate the rack-bars 7 and shift the position of the plate or form cylidners. Of course it is understood that the rotation of the impression-cylinder moves the controlling-cam arm past the governing-shoe. If the cam-arm is in its inner position and it is desired to shift it to its outer position, the governing-shoe is shifted to its inner position against the stop 41, and when the cam-arm reaches the shoe the projecting roller 35 on the cam-arm will ride upon the outer surface of the controlling-shoe and shift the cam-arm to its outer position, as shown in Fig. 2.

To manually change the position of the governing-shoe, any suitable device may be employed; but it is preferable to provide the press with the mechanism which will presently be described in which the governing-shoe is shifted in either direction—that is, toward or away from the axis of the impression-cylinder—by the same movement of the operator's lever, the shoe of course moving alternately from one position to the other.

A further advantage of the mechanism which is about to be described is that the governing-shoe is securely held in either of its shifted positions until released and again moved at the will of the operator. This mechanism comprises an arm 42, carried on the journal 37 of the governing-shoe 38, said arm having pivoted thereto a rod 43, which is provided with an expansion-spring 44 for the purpose of giving the shoe a normal tendency to move toward its inner position. This arm 42 is preferably formed with a square under face or shoulder 46, which is adapted to be engaged by a movable trip-finger 45 when the shoe is moved to its outer position for the purpose of locking the shoe in said outer position. A heel 48 projects rearwardly from the journal 37 of the governing-shoe, and a pin 49, mounted on said heel, travels in an elongated slot 51 of a rod or pitman 50, which is suitably connected with the operator's lever. The upward movement of this rod or pitman does not affect the movement of the governing-shoe; but its downward movement rocks the shoe upon its pivot and moves it to its outer position, the trip-finger 45 springing into engagement with the shoulder 46 for locking the governing-shoe in its outer position, as illustrated in Fig. 6. Interjacent to the trip-finger 45 and the rod 50 is a rotary cam 53, which is journaled on a stud 54, suitably supported by a bracket 55 and the machine-frame, and is adapted to be intermittently rotated by means of an oscillating pawl 56, mounted on a rock-arm 57, connected through the medium of a link 58 with the rod or pitman just referred to. Journaled on the stud 54 and secured to the cam 53 is a ratchet-wheel 60, which is engaged and partially rotated by the pawl 56 for each operation of the rod 50, the rotation of the ratchet-wheel transferring to the cam a similar partial rotation. An antifriction-roller 62, carried by the trip-finger 45, travels upon this intermittently-rotatable cam, the cam being formed with alternate low and high portions, respectively designated as 53' and 53", so as to move the trip-finger alternately toward and away from the locking-shoulder on the arm 42. The trip-finger 45 has pivoted thereto a rod 63, upon which is mounted an expansion-spring 64 for holding the antifriction-roller 62 in peripheral contact with the cam.

By referring to Fig. 8 the connecting elements between the rod 50 and the operator's tripping device is shown, wherein a rock-arm 66 is suitably pivoted to the machine-frame, one end of said rock-arm being connected to the rod or pitman 50 and the other end to a downwardly-projecting link 67, which link is in turn connected to a second rock-arm 68, pivoted to the machine-frame under the footboard 69. The rock-arm 68 has secured to one end thereof an upwardly-projecting rod 70, provided with a collar 71 to limit its upward movement. Pivoted to the rock-arm 68 on the same end with rod 70 is a rod 72, upon which is mounted an expansion-spring 73, which tends to normally hold the rod 70 and the pitman 50 in raised position. The rock-arm 66 has an upwardly-projecting lug or arm 75, carrying an antifriction-roller 76, which is adapted to be engaged by a cam 77, secured on one end of the impression-cylinder shaft. The object of this device is to prevent the operator from actuating the mechanism for shifting the governing-shoe when the controlling-cam arm 26 closely approaches the governing-shoe, as shown in Fig. 3.

The described mechanisms for shifting the plate-cylinders may be duplicated at the opposite sides of the press, as described, or a single set of such mechanisms may be employed at only one side of the machine.

The operation of the hereinbefore-described mechanisms is as follows: When the press is started and the form-cylinders are properly inked, the operator depresses the rod 70, which in turn rocks the arm 68, forcing the link 67 upwardly, thereby rocking the arm 66 and giving the rod or pitman 50 a downward movement and causing the governing-shoe 38 to move inwardly into the path of the roller 35, carried on the controlling-cam arm. Further rotation of the impression-cylinder carries the controlling-cam arm past the governing-shoe, which shifts the cam-arm to its outer positon. The continued rotation of the impression-cylinder moves the controlling-cam arm into successive engagement with the trip-arms of the latches 16, thereby successively releasing the bell-crank levers of the plate or form cylinders, so that the controlling-cam arm will engage the antifriction-rollers on the free ends of the bell-crank levers, and thereby move the rack-bars outwardly, moving the plate or form cylinders in printing position, as shown in Fig. 3. After the controlling-cam has operated the several bell-crank levers they will be locked in the position to which they are shifted by said cam and remain in such position until the operator again operates the mechanism controlling the governing-shoe.

When the governing-shoe has moved into the position shown in Fig. 6, the roller on the cam-arm will engage the under surface of the governing-shoe and cause said cam-arm to be drawn toward the axis of the impression-cylinder, so that as it continues to rotate the antifriction-rollers on the ends of the bell-crank levers will ride over the outer surface of the controlling-cam, causing the rack-bars to be moved inwardly and the plate or form cylinders to be moved out of printing position with relation to the impression-cylinder.

Having thus described our invention, the following is what we claim as new therein and desire to secure by Letters Patent—

1. In a printing-press, the combination of the form and impression cylinders, and means for relatively shifting said cylinders into and out of printing position, with a shiftable revolving cam member adapted to actuate said cylinder-shifting means, and a device interposed in the path of said cam member adapted to shift it toward and away from its axis of revolution, substantially as and for the purpose set forth.

2. In a printing-press, the combination of the form and impression cylinders, and means for shifting one of said cylinders toward and away from the other, with a shiftable cam member mounted upon and revolving with one of said cylinders and adapted to actuate said cylinder-shifting means, and a shiftable device interposed in the path of the cam member and adapted to shift it toward and away from its axis of revolution, substantially as set forth.

3. In a printing-press, the combination of the form and impression cylinders, and means for shifting one of said cylinders toward and away from the other, with a shiftable cam member mounted upon and revolving with one of said cylinders and adapted to actuate said cylinder-shifting means, a shiftable device interposed in the path of said cam member and adapted to shift it toward and away from its axis of revolution, and manually-operated means controlling the position of said shiftable device, substantially as set forth.

4. In a printing-press, the combination of the form and impression cylinders, and means for shifting one of said cylinders toward and away from the other, with a cam member mounted upon one of said cylinders and adapted to be shifted toward and away from its axis of revolution, manually-controlled means interposed in the path of the cam member for shifting its position, and means for retaining the cam member in either shifted position, substantially as set forth.

5. In a printing-press, the combination of the form and impression cylinders, and means for shifting one of said cylinders toward and away from the other, with a shiftable cam member mounted upon and revolving with one of said cylinders and adapted to actuate said cylinder-shifting means, a shiftable device interposed in the path of said cam member and adapted to shift it toward and away from its axis of revolution, means for retaining said device in either of its shifted positions, and manually-operated means for shifting said device, substantially as set forth.

6. In a printing-press, the combination of the form and impression cylinders, and means for shifting one of said cylinders toward and away from the other, with a shiftable cam member mounted upon and revolving with one of said cylinders and adapted to actuate said cylinder-shifting means, means for retaining the cam member in either of its shifted positions, a shiftable device interposed in the path of said cam member and adapted to shift it toward and away from its axis of revolution, means for retaining said device in either of its shifted positions, and manually-operated means for shifting said device, substantially as set forth.

7. In a printing-press, the combination of the form and impression cylinders, a revolving cam member, mechanisms operatively controlled by the cam member to move the form-cylinders into and out of printing position, means for changing the operative position of the cam member with relation to the form-cylinder-moving mechanisms, and automatic means for locking the form-cylinder-moving mechanisms when the form-cylinders are moved into printing position.

8. In a printing-press, the combination of the form and impression cylinders, means for moving said form-cylinders into and out of printing position, means for locking said mechanisms when the form-cylinders are in the printing position, and operating means carried by the impression-cylinder adapted to first release the said locking means and then actuate the form-cylinder-moving mechanisms, as set forth.

9. In a printing-press, the combination of the form and impression cylinders, means for moving said form-cylinders into and out of printing position, automatic hooks for locking said mechanisms when the form-cylinders are in their printing position, and means carried by the impression-cylinder for releasing said hooks and operating the means for moving the form-cylinders, substantially as set forth.

10. In a printing-press, the combination of the form and impression cylinders, devices for moving said form-cylinders into and out of printing position, spring-actuated means for locking said devices when the form-cylinders are in printing position, a cam member on the impression-cylinder adapted to release said locking means, and a governing device interposed in the path of the cam member to shift said cam member to operatively control the form-cylinder-moving devices and the means for locking said devices.

11. In a printing-press, the combination of the form and impression cylinders, means for moving said form-cylinders into and out of printing position, a cam member on the impression-cylinder, a governing-shoe interposed in the path of the cam member, means for shifting said governing-shoe to control the operative relation of the cam member with the cylinder-moving means, and means for rendering inoperative the means controlling the governing-shoe when the cam member closely approaches the governing-shoe.

12. In a printing-press, the combination of the impression-cylinder, a cam member carried thereon, a device interposed in the path of said cam for shifting said cam member toward and away from its axis of revolution, means controlling the said device, and means for momentarily rendering inoperative the means for controlling said device, when the cam member on the cylinder closely approaches said device.

13. In a printing-press, the combination of an impression-cylinder and a plurality of form-cylinders, means operatively engaging said form-cylinders to move them into and out of printing position, a cam member on the impression-cylinder, a governing device adapted to shift the operative position of said cam member, and oscillating devices connected to the means for moving the form-cylinders said oscillating devices being controlled by the cam member.

14. In a printing-press, the combination of the form and impression cylinders, two independent throw-out mechanisms operating upon the opposite ends of one of said cylinders, controlling cam members at each end of said cylinder operatively connected, and means for operatively controlling said cam members to operate the throw-out mechanisms.

15. In a printing-press, the combination of an impression-cylinder, a plurality of form-cylinders, independent throw-out mechanisms for said form-cylinders, a common controlling-cam effecting the operation of said throw-out mechanisms, and a governing device adapted to change the operative position of said cam with relation to the throw-out mechanisms as set forth.

16. In a printing-press, the combination of the form and impression cylinders, independent throw-out mechanisms operating at opposite ends of the impression-cylinder, and a common controlling mechanism adapted to operate the independent throw-out mechanisms and cause them to be simultaneously operated at both ends of the impression-cylinder as set forth.

17. In a printing-press, the combination of the form and impression cylinders, means for moving said form-cylinders into and out of printing position, actuating-levers included in said cylinder-moving means, a shiftable cam member mounted upon and rotating with the impression-cylinder and formed with inner and outer working cam-faces which are adapted to engage and operate said levers, one of said cam-faces being active in each of the shifted positions of the cam member, and means for shifting said cam member toward and away from its axis of revolution, substantially as set forth.

18. In a printing-press, the combination of the form and impression cylinder, cylinder-moving mechanisms operating upon the form-cylinders and including pivotally-mounted actuating-levers, automatic hooks adapted to engage said levers for locking them against movement when the form-cylinders are in printing position, and a shiftable cam member provided with a part which is adapted to disengage said hooks from said levers and with cam-faces which are adapted to engage and actuate said levers after they are released from said hooks, substantially as set forth.

19. In a printing-press, the combination of the form and impression cylinders, means for moving the form-cylinders into and out of printing position, actuating-levers included in said cylinder-moving means, automatic hooks adapted to engage said levers, and lock them against movement when the cylinders are in printing position, a spring-sustained tripper on each of said locking-hooks arranged to move the hook when pressure is applied to it in one direction and to yield without affecting the hook when pressure is applied to it in the opposite direction, and a shiftable cam member mounted upon and revolving with the impression-cylinder and adapted to operate upon said hook-trippers and upon said levers of the cylinder-moving means, substantially as set forth.

20. In a printing-press, the combination of the form and impression cylinders, means for moving the form-cylinders into and out of printing position, actuating-levers included in said cylinder-moving means, spring-actuated hooks, shoulders upon said levers engaged by said hooks, a tripper pivotally mounted on each of said hooks, a stop-lug upon each hook supporting the tripper against movement in the one direction, a spring acting upon said tripper to hold it in engagement with said stop-lug, and a revolving cam member operating upon said tripper and upon said lever, substantially as set forth.

21. In a printing-press, the combination of the form and impression cylinders, means for moving the form-cylinders into and out of printing position, and a shiftable cam member adapted to actuate said cylinder-moving means, with a shiftable governing-shoe mounted in the path of the cam member and formed with two cam-surfaces, one of which is adapted to engage a part of the cam member for actuating it in each of the shifted positions of the governing-shoe, and means for shifting the position of said shoe, substantially as set forth.

22. In a printing-press, the combination of the form and impression cylinders, means for moving said form-cylinders into and out of printing position, a movable cam member adapted to actuate said cylinder-moving means, with a shiftable governing-shoe supported in the path of the cam member and adapted to shift its position, and manually-operated controlling means so constructed and arranged that its successive operating strokes will move the governing-shoe alternately into its different shifted positions, substantially as set forth.

23. In a printing-press, the combination of the form and impression cylinders, means for moving said form-cylinders into and out of printing position, a movable cam member adapted to actuate said cylinder-moving means, with a shiftable governing-shoe supported in the path of the cam member and adapted to shift its position, a spring tending to throw said governing-shoe into one position, a latch adapted to retain said governing-shoe in its opposite shifted position against the tendency of said spring, and manually-operated controlling means suitably connected with said shoe and said latch, substantially as set forth.

24. In a printing-press, the combination of the form and impression cylinders, means for moving said form-cylinders into and out of printing position, a movable cam member adapted to actuate said cylinder-moving means, with a shiftable governing-shoe supported in the path of the cam member and adapted to shift its position, a spring tending to hold said shoe in one position, manually-operated controlling means adapted to move the shoe into its opposite position, a latch adapted to retain the shoe in said opposite position, a controlling-cam provided with a ratchet-wheel, a part on said latch engaging said cam, and an oscillating pawl engaging said ratchet-wheel and suitably connected with the manually-operated controlling means, substantially as set forth.

25. In a printing-press, the combination of the form and impression cylinders, means for moving said form-cylinders into and out of printing position, a movable cam member adapted to actuate said cylinder-moving means, with a shiftable governing-shoe supported in the path of the cam member and adapted to shift its position, manually-operated controlling means suitably connected with said controlling-shoe for shifting its position, and a cam rotating with the impression-cylinder and adapted to engage a part upon the manually-operated controlling means to prevent the operation of the controlling means during a certain period of the operation of the machine, substantially as and for the purpose set forth.

THOMAS G. CLARIDGE.
THOMAS A. RANDALL.

Witnesses:
   Wm. E. Knight,
   J. Green.